(12) United States Patent
Oomori et al.

(10) Patent No.: US 7,375,447 B2
(45) Date of Patent: May 20, 2008

(54) POWER TOOL

(75) Inventors: Katsuhiro Oomori, Ibaraki (JP);
Atsushi Nakagawa, Ibaraki (JP);
Yasuyuki Ooe, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 148 days.

(21) Appl. No.: 11/073,758

(22) Filed: Mar. 8, 2005

(65) Prior Publication Data
US 2005/0200215 A1  Sep. 15, 2005

(30) Foreign Application Priority Data
Mar. 10, 2004  (JP) .................. P 2004-068197

(51) Int. Cl.
*H02K 21/26* (2006.01)
(52) U.S. Cl. .................. 310/88; 310/154.01
(58) Field of Classification Search ............ 310/88–89, 310/154.01, 154.06, 154.36
See application file for complete search history.

(56) References Cited

U.S. PATENT DOCUMENTS

| | | | | |
|---|---|---|---|---|
| 4,748,358 A * | 5/1988 | Ruhle et al. | ........... | 310/154.15 |
| 5,481,148 A * | 1/1996 | Moribayashi et al. | .. | 310/154.16 |
| 5,767,596 A * | 6/1998 | Stark et al. | ........... | 310/89 |
| 6,661,148 B2 * | 12/2003 | Oomori et al. | ........... | 310/239 |

2002/0182020 A1  12/2002  Oomori et al.

FOREIGN PATENT DOCUMENTS

| | | |
|---|---|---|
| CN | 1078399 | 1/2002 |
| CN | 1374173 | 10/2002 |
| DE | 26 12 364 | 9/1977 |
| DE | 102 03 890 A1 | 8/2003 |
| JP | 2002-254337 | 9/2002 |
| JP | 2004-80969 | 3/2004 |
| NL | 104 930 C | 5/1963 |

OTHER PUBLICATIONS

European Search Report dated Jul. 28, 2005.
Chinese Office Action dated Sep. 29, 2006 with English Translation.

* cited by examiner

*Primary Examiner*—Thanh Lam
(74) *Attorney, Agent, or Firm*—McGinn IP. Law Group, PLLC

(57) ABSTRACT

A power tool includes: a stator having a substantially cylindrical yoke and a plurality of permanent magnets that are firmly fixed to an inner surface of the yoke and circumferentially spaced from each other by a first gap; a rotor inserted inside the permanent magnets at a second gap radially; an outer frame portion that accommodates the stator and the rotor; a ventilation hole formed in the outer frame portion to place the first and second gaps in communication with an atmosphere; and a dustproof member comprising a ferromagnetic material, which is mounted in contact with the stator and has a protruding portion located in a passage going from the first and second gaps to the atmosphere via the ventilation hole.

15 Claims, 6 Drawing Sheets

POWER TOOL

BACKGROUND OF THE INVENTION

1. Field of the Invention

The present invention relates to a technique for enhancing the dustproofing capability of a power tool having ventilation holes in its outer frame.

2. Description of the Related Art

There is a tendency that the current fed into electric motors is increased in order to offer smaller power tools with higher output power. Concomitantly, there is a tendency that the stator and rotor are directly supported by the outer frame portion to enlarge the flow passage for cooling wind, as described in JP-A-2002-254337, to suppress generation of heat from the motor.

Furthermore, there is a tendency that permanent magnets having stronger magnetic flux are adopted in a power tool using a DC motor, in order to offer a smaller motor with higher output power.

SUMMARY OF THE INVENTION

Power tools are used in wide applications including building of general frame houses, electric works, gas works, waterworks, tubular works, and interior finishing. Where power tools are used outdoors or where a teks screw is tightened while generating iron powder, powder dust such as iron powder might intrude into the power tool. If the powder dust such as iron powder intrudes into the gap between the stator and rotor, the motor locks up, resulting in a large current. This may cause a failure of the power tool.

In the structure where the flow passage for cooling wind is large and the magnetic flux of the permanent magnets is strong as described above, there is the problem that powder dust such as iron powder easily intrudes into the power tool. Especially, dust powder such as iron powder easily intrudes into ventilation holes formed adjacent to the centrifugal fan because they are close to the permanent magnets.

The present invention has been made in view of the above circumstances and provides a power tool which has excellent dustproofing.

According to a first aspect of the invention, a power tool includes: a yoke having a substantially cylindrical shape; a plurality of permanent magnets that are firmly fixed to an inner surface of the yoke and circumferentially spaced from each other by a first gap; a stator having the permanent magnets; a rotor inserted inside the permanent magnets at a second gap radially; an outer frame portion that accommodates the stator and the rotor; a ventilation hole formed in the outer frame portion to place the first and second gaps in communication with an atmosphere; and a dustproof member comprising a ferromagnetic material, which is mounted in contact with the stator and has a protruding portion located in a passage going from the first and second gaps to the atmosphere via the ventilation hole.

According to the configuration of the first aspect of the invention, the magnetically excited dustproof member can attract the iron powder intruding from the ventilation holes prior to intruding into the first and second gaps. Therefore, it is possible to prevent the iron powder from intruding into the gap between the stator and rotor; otherwise, the motor would lock up. A power tool having excellent dustproofing can be offered.

According to a second aspect of the invention, the rotor has a centrifugal fan, and the protruding portion is located within the passage communicating with the atmosphere from the outer periphery of the centrifugal fan through the ventilation hole.

According to the configuration of the second aspect of the invention, the magnetically excited dustproof member can attract iron powder intruding from the ventilation holes prior to intruding into the centrifugal fan. Therefore, it is possible to prevent the iron powder from intruding into the gap between the stator and rotor; otherwise, the motor would lock up. Hence, a power tool having excellent dustproofing can be offered.

According to a third aspect of the invention, the dustproof member has a hole portion through which the rotor can pass, and the protruding portion extends axially from an end surface of the hole portion.

According to the configuration of the third aspect of the invention, the magnetically excited dustproof member can attract iron powder intruding from the ventilation holes immediately prior to intruding into the first and second gaps. Therefore, it is possible to prevent the iron powder from intruding into the gap between the stator and rotor; otherwise, the motor would lock up. Hence, a power tool having excellent dustproofing can be offered.

According to a fourth aspect of the invention, a power tool includes: a yoke having a substantially cylindrical shape; a plurality of permanent magnets that are firmly fixed to an inner surface of the yoke and circumferentially spaced from each other by a first gap; a stator having the permanent magnets; a rotor inserted inside the permanent magnets at a second gap radially; an outer frame portion that accommodates the stator and the rotor; a ventilation hole formed in the outer frame portion to place the first and second gaps in communication with an atmosphere; and a dustproof member comprising a ferromagnetic material and mounted in contact with the stator, in which the dustproof member is mounted so as to plug up the second gap at an end surface of the stator.

According to the configuration of the fourth aspect of the invention, the magnetically excited dustproof member can attract iron powder intruding from the ventilation holes prior to intruding into the second gap. Therefore, it is possible to prevent the iron powder from intruding into the gap between the stator and rotor; otherwise, the motor would lock up. Hence, a power tool having excellent dustproofing can be offered.

DETAILED DESCRIPTION OF THE PREFFERED EMBODIMENTS

While the invention has been described in detail and with reference to specific embodiments thereof, it will be apparent to one skilled in the art that various changes and modifications can be made without departing from the scope thereof.

This application is based on Japanese patent application No. 2004-068197 filed on Mar. 10, 2004, the entire contents thereof being incorporated by reference.

Figure 1:
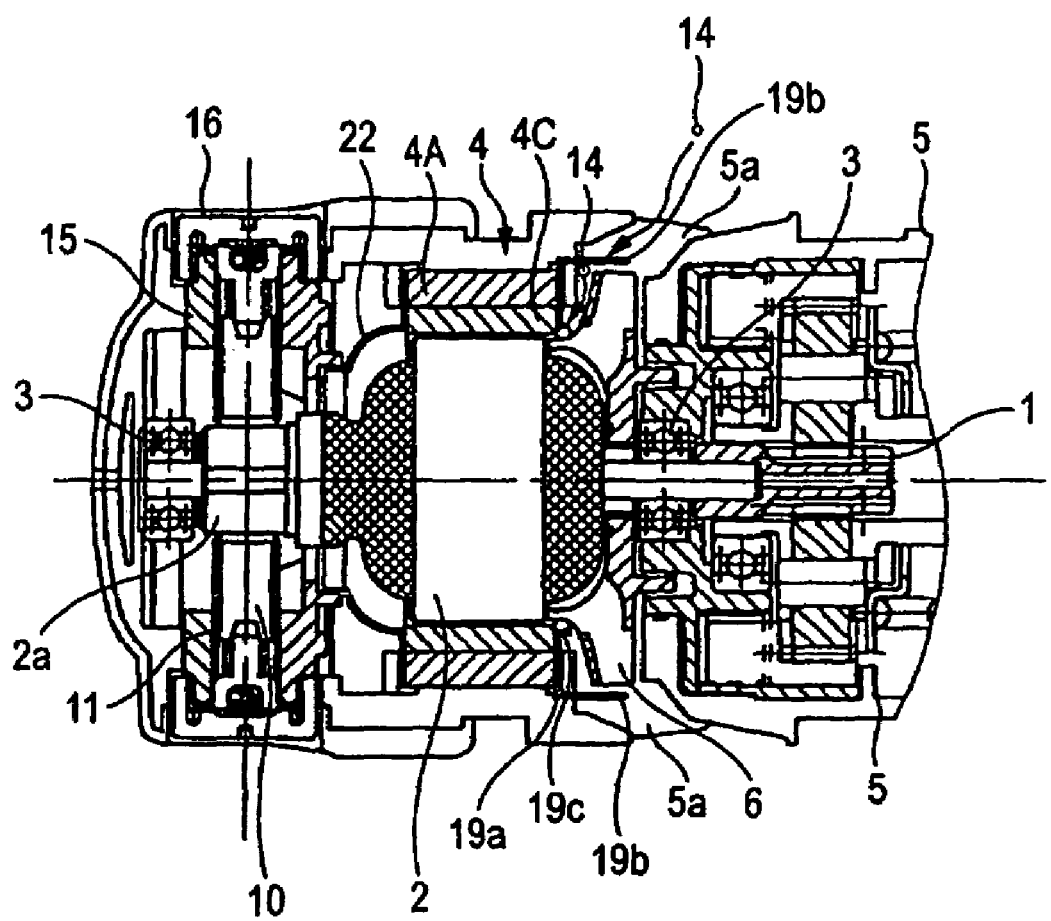
FIG. 1 is a fragmentary cross section as viewed from above a power tool according to an embodiment of the present invention.
Figure 2:
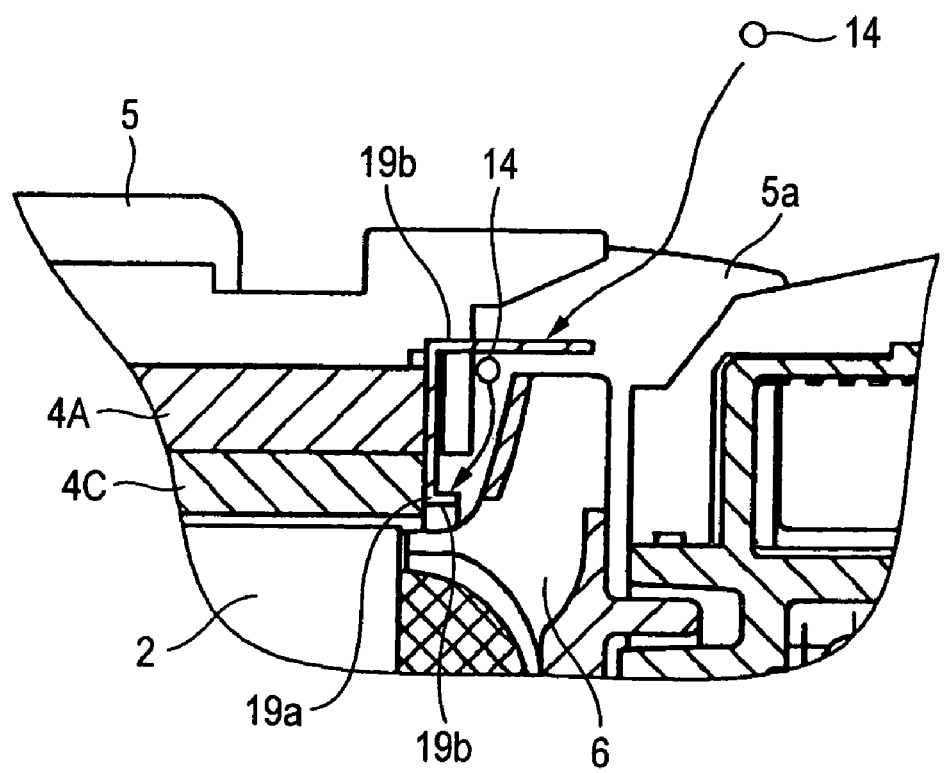
FIG. 2 is an enlarged view of main portions of the tool shown in FIG. 1.
Figure 3:
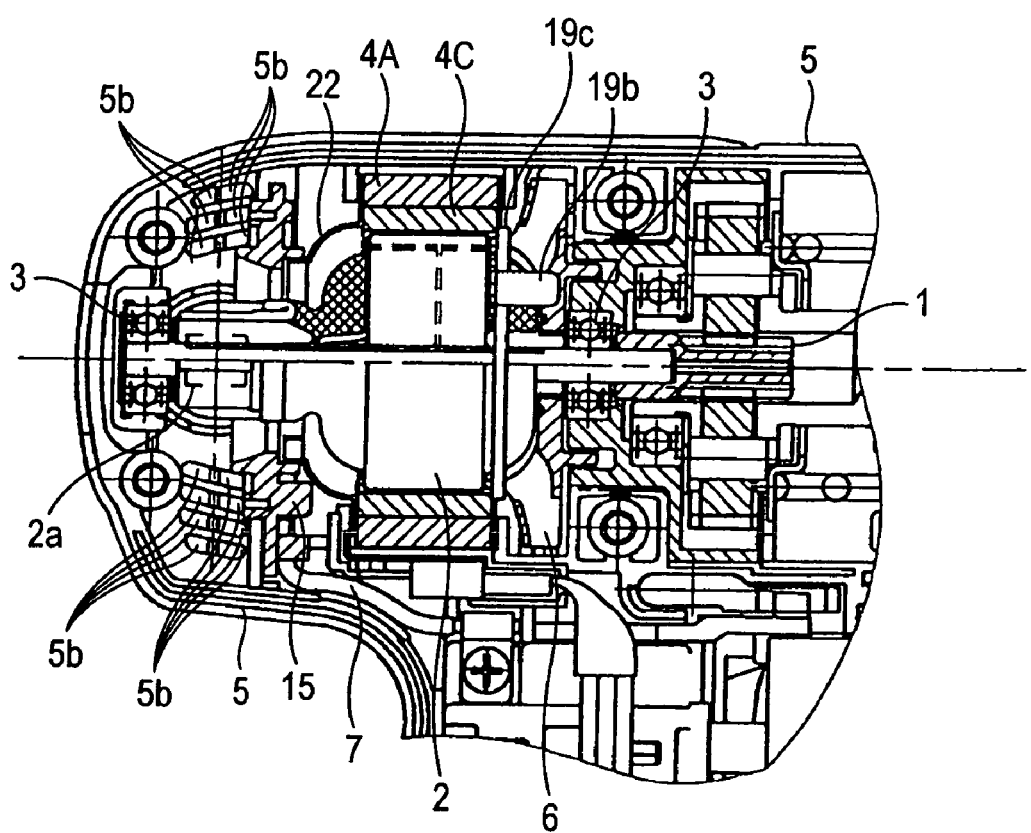
FIG. 3 is a fragmentary cross section as viewed from aside of a power tool according to an embodiment of the invention.
Figure 4:
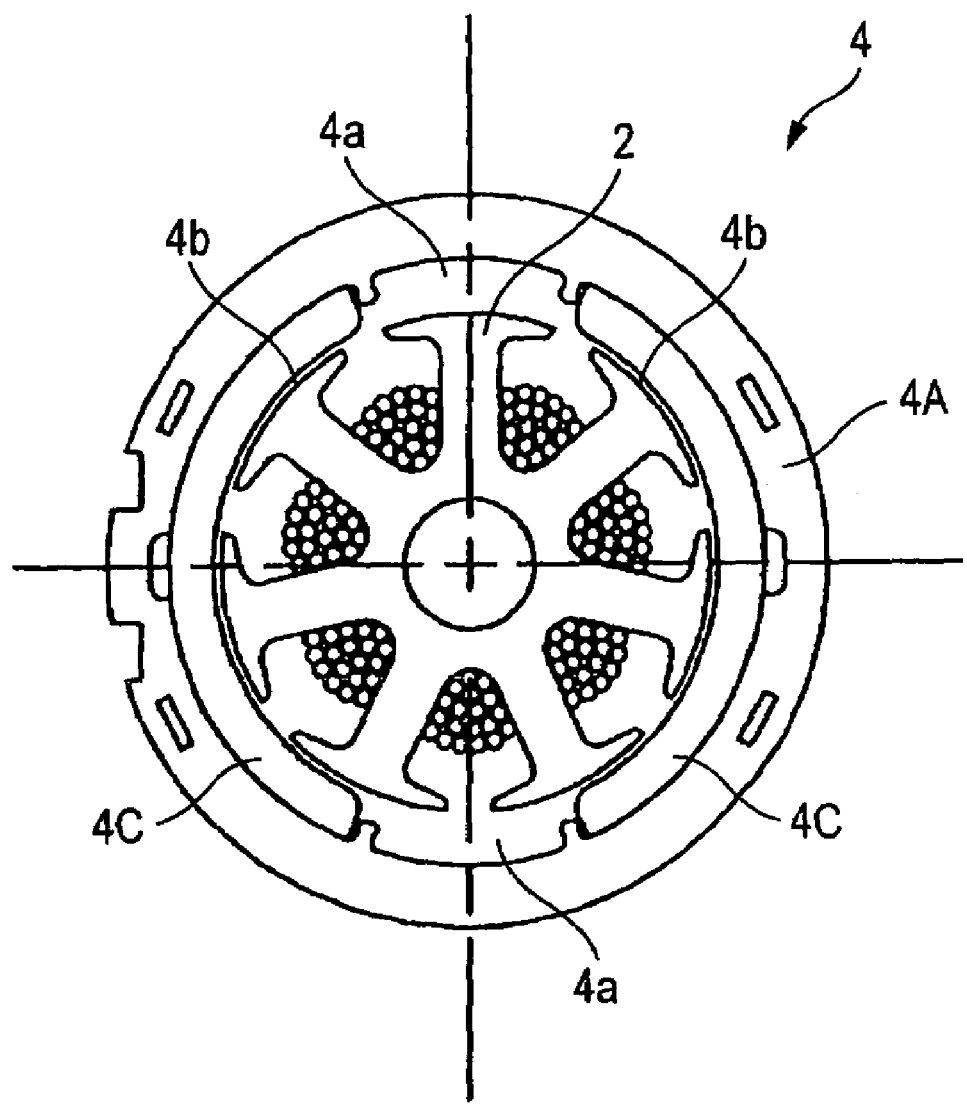
FIG. 4 is a cross-sectional view of a stator and a rotor according to an embodiment of the invention.
Figure 5:
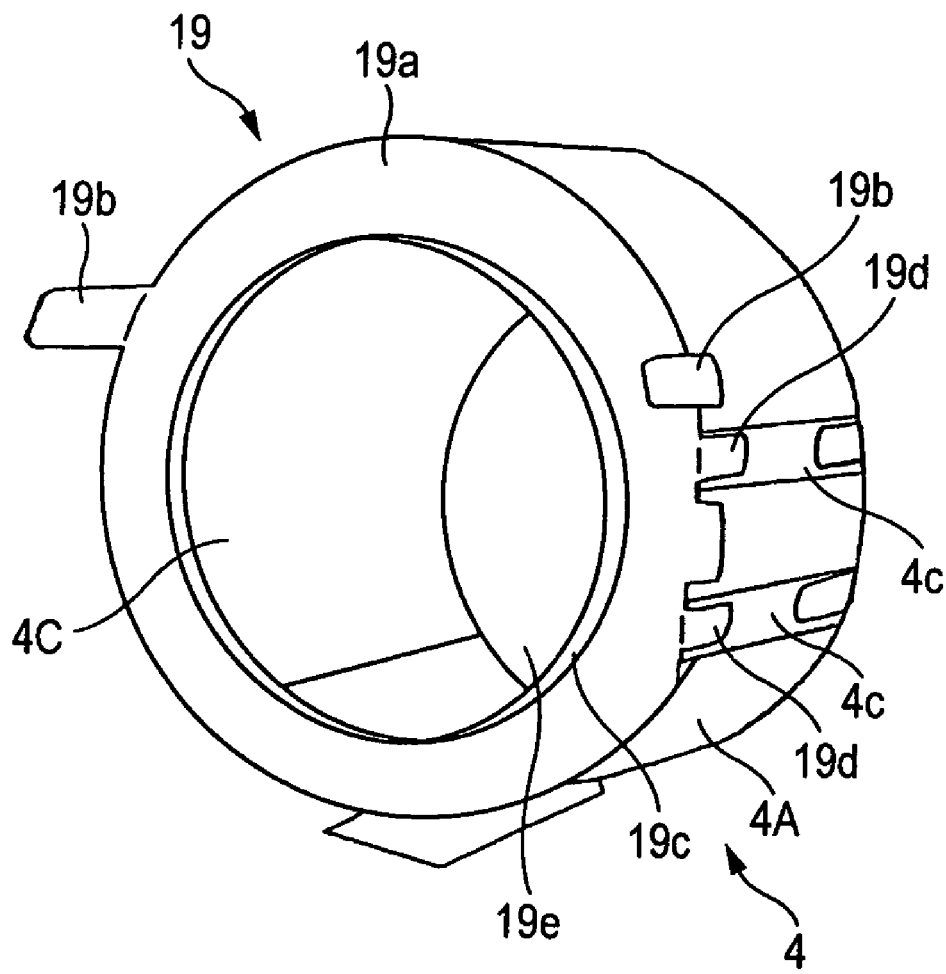
FIG. 5 is a perspective view showing the outer appearances of a stator, a rotor, and a dustproof member according to an embodiment of the invention.
Figure 6:
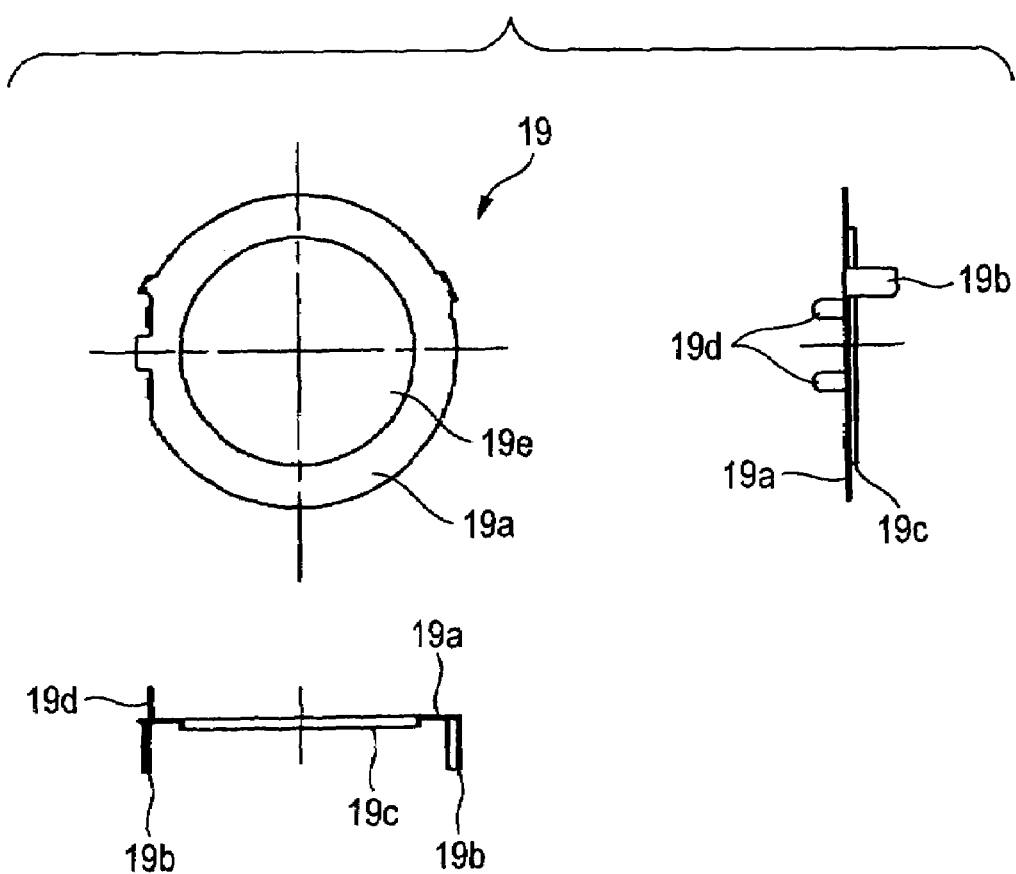
FIG. 6 shows three views of a dustproof member according to an embodiment of the invention.

FIG. 1 is a fragmentary cross section as viewed from above a power tool according to an embodiment of the present invention. FIG. 2 is an enlarged view of main portions of FIG. 1. FIG. 3 is a fragmentary cross section as viewed from a side of a power tool according to an embodiment of the invention. FIG. 4 is a cross-sectional view of a stator and a rotor according to an embodiment of the invention. FIG. 5 is a perspective view showing the outer appearances of a stator and a dustproof member according to an embodiment of the invention. FIG. 6 shows three views of a dustproof member according to an embodiment of the invention.

An outline of the structure of a power tool is hereinafter described. The power tool comprises an outer frame portion 5 forming its outer contour, a battery back (not shown) detachably mounted to the outer frame portion 5, an electric motor (not shown) rotated by electric power from the battery pack (not shown), a switch (not shown) mounted between the battery pack (not shown) and the motor (not shown) and controlling supply and stop of electric power to the motor (not shown), a drive portion (not shown) driven by rotation of the motor (not shown), and a tool (not shown) at the tip. The tool is detachably attached to the drive portion (not shown).

The structure of the motor will be described below. The motor has a substantially cylindrical yoke 4A, a stator 4, a rotor 2, and a centrifugal fan 6 rigidly mounted to the rotor 2. The stator 4 has a substantially cylindrical yoke 4A and two permanent magnets 4C that are firmly mounted to the inner surface of the yoke and circumferentially spaced from each other by a first gap 4a. The rotor 2 is inserted inside the permanent magnets 4C at a second gap 4b radially. The stator 4 and rotor 2 are housed in the outer frame portion 5.

In addition, the motor has carbon brushes 10 and a CB block 15. The brushes 10 are pressed against the commutator 2a of the rotor 2, providing rectification. The CB block 15 is made of a resin and shaped like a ring. The block has a hole (not shown) in its center. The rotor 2 is inserted in this hole. The CB block holds a CB tube 11, a CB cap 16, and lead wire (not shown). The CB tube is fabricated by stamping a metal sheet and slidably holds the carbon brushes 10. The CB cap 16 is made of a resin and screwed over the CB block 15, preventing the carbon brushes 10 from coming off.

A flow passage for cooling wind is hereinafter described. Plural ventilation holes 5a and 5b are formed in the outer frame portion 5. The ventilation holes 5a consist of plural holes arranged circumferentially of the centrifugal fan 6 in positions adjacent to the outer periphery of the centrifugal fan 6. The ventilation holes 5b consist of plural holes formed behind the CB block 15.

A heat-dissipating plate 22 is mounted between the CB block 15 and the stator. The heat-dissipating plate 22 is shaped like an annular form by stamping a metal sheet. The heat-dissipating plate 22 has a rear end inserted in a recessed portion (not shown) of the CB block 15. The diameter of the plate increases in going forwardly from the rear end. The front end is shaped like a disk and attracted to the stator by magnetic force.

The centrifugal fan 6 is firmly secured to the rotor 2 such that it is located ahead of the stator. The fan has a plurality of blades (not shown) protruding circumferentially. When the rotor 2 turns, centrifugal force is given to air present between the blades (not shown) of the centrifugal fan 6, so that the air flows radially toward the outside from inside.

Accordingly, the flow passage for cooling wind is constructed as follows. Air flows in from the ventilation holes 5b acting as intake ports. The air flows through the hole portion (not shown) of the CB block 15, inside of the heat-dissipating plate 22, and gap between the stator and rotor 2. Centrifugal force is given by the centrifugal fan 6. The air is expelled from the ventilation holes 5a acting as vent ports.

The dustproof member 19 will be described below. The dustproof member 19 is fabricated by stamping an iron sheet having a thickness of about 0.5 mm. The dustproof member 19 consists of a substantially cylindrical base portion 19a, two first protruding portions 19b extending axially forwardly from the outer periphery of the base portion 19a, a hole portion 19e formed such that the rotor 2 can pass through the hole portion, a second protruding portion 19c extending axially forwardly from the fringes of the hole portion 19e, and a third protruding portion 19d extending axially rearwardly from the outer periphery of the base portion 19a. The dustproof member 19 is made of iron and mounted in contact with the stator 4. Therefore, the dustproof member is magnetically excited by the magnetic force of the permanent magnets 4C. Accordingly, when iron powder 14 comes to the surroundings of the dustproof member 19, the iron powder 14 is attracted to the dustproof member 19.

The first protruding portions 19b are mounted so as to be located between the ventilation holes 5a and the outer periphery of the centrifugal fan 6. The protruding portions are so mounted that when they are viewed from a direction substantially perpendicular to the ventilation holes 5a, the protruding portions partially overlap with the ventilation holes 5a. The first protruding portions 19b each assume a form like a flat plate extending perpendicularly to the radial direction of the stator 4. Accordingly, the iron powder 14 intruding from the ventilation holes 5a easily collides with the first protruding portions. Most of the iron powder 14 is attracted. Experiment using a structure having only the first protruding portions 19b has revealed that most of the iron powder 14 is attracted to or collides with the first protruding portions 19b, thus effectively preventing intrusion into the inside.

The base portion 19a is similar in outside diameter with the yoke 4A and assumes a substantially disklike form. A hole portion 19e having an inside diameter substantially equal to the inside diameter of the permanent magnets 4C is formed in the center such that the rotor 2 can be inserted in the hole portion. The base portion 19a is mounted by magnetic force so as to substantially fully cover the end surface of the stator 4. Accordingly, if the iron powder 14 comes and intrudes without being attracted to the first protruding portions 19b, it is attracted to the base portion 19a. Furthermore, the base portion 19a almost completely plugs up the first gap 4a between the adjacent permanent magnets 4C and so the iron powder 14 does not readily intrude into the first gap 4a.

The second protruding portion 19c is substantially cylindrical in shape, and extends axially forwardly from the fringes of the hole portion 19e having an inside diameter substantially equal to the inside diameter of the permanent magnets 4C. The second protruding portion is so mounted that a slight gap is formed between this portion and the centrifugal fan 6. Accordingly, if the iron powder 14 comes and intrudes without being attracted to the first protruding portions 19b or the base portion 19a, the powder is attracted to the second protruding portion 19c. Since the second protruding portion 19c projects over the whole periphery, intrusion of the iron powder 14 into the first gap 4a and second gap 4b can be prevented effectively. In addition, it has been proved that the dustproofing effect is enhanced by making the diameter of the second protruding portion 19c substantially equal to the inside diameter of the permanent magnets 4C. Experiment using a structure having only the second protruding portion 19c has shown that the iron powder 14 is mostly attracted to or collides with the second protruding portion 19c, effectively preventing intrusion into the inside.

Since the first protruding portions 19b, base portion 19a, and second protruding portion 19c are combined, a triple protection is provided. By combining these portions appropriately to have a single or double protection, dustproofing is provided. However, the dustproofing effect can be increased further by increasing the number of stages of protection to double and triple.

The third protruding portion 19d is engaged in a recessed portion 4c formed in the yoke 4A. This places the dustproof member 19 and yoke 4A in position circumferentially. A convex portion (not shown) engaged in the recessed portion 4c is formed on the housing 5. This places the yoke 4A and housing 5 in position circumferentially.

Another embodiment is herein after described. If the first protruding portions 19b are so mounted that they seem to overlap fully with the ventilation holes 5a when viewed substantially in a direction perpendicular to the ventilation holes 5a, the flow rate of the cooling wind decreases but the dustproofing is enhanced. If the first protruding portions 19b are so mounted that they seem to half overlap with the ventilation holes 5a, the flow rate of the cooling wind does not decrease so much, and a sufficient level of dustproofing is obtained. If the first protruding portions 19b are so mounted that they seem to overlap about ten percents of the ventilation holes 5a, the flow rate of the cooling wind hardly decreases. Also, dustproofing is obtained.

The number of the first protruding portions 19b is not limited to two. Only one first protruding portion may be provided. Also, multiple first protruding portions may be provided. If more first protruding portions are provided, the dustproofing is enhanced further. In addition, if the first protruding portions 19b each assume a form of a flat plate substantially parallel to the radial direction of the stator 4, the flow rate of the cooling wind decreases little, though the dustproofing is deteriorated slightly.

If the first protruding portions 19b are made of a non-magnetic material such as a plastic, the action of attracting the iron powder 14 is lost but slight dustproofing is obtained because the action of causing the iron powder 14 to collide is obtained.

Another advantage of a second protruding portion 19c is that temperature rise of the rotor 2 that is a heat source can be suppressed effectively by throttling the flow passage and supplying a stream of air with higher velocity between the rotor 2 and the stator 4. By matching the inside diameter of the dustproof member 19 to the inside diameters of permanent magnets 4C, the air passage can be made to have no unevenness. Thus, the pressure loss is reduced. The cooling efficiency is improved by supplying a smooth stream of air.

By making the base portion 19a in contact with the stator 4 as described in JP-A-2004-080969, an action of reducing flux leakage from the permanent magnets 4C is obtained. The force at which the iron powder 14 is attracted to the inside can be reduced. Accordingly, the dustproofing is enhanced, in combination of the attracting and colliding action of the protruding portions of the present invention.

What is claimed is:

1. A power tool, comprising:
    a stator comprising a substantially cylindrical yoke and a plurality of permanent magnets that are firmly fixed to an inner surface of the yoke and circumferentially spaced from each other by a first gap;
    a rotor inserted inside the permanent magnets at a second gap radially;
    an outer frame portion that accommodates the stator and the rotor;
    a ventilation hole formed in the outer frame portion to place the first gap and the second gap in communication with an atmosphere; and
    a dustproof member comprising a ferromagnetic material, which is mounted in contact with the stator and comprises a protruding portion located in a passage going from the first gap and the second gap to the atmosphere via the ventilation hole.

2. The power tool according to claim 1, wherein the rotor comprises a centrifugal fan, and
    wherein the protruding portion is located within the passage communicating with the atmosphere from an outer periphery of the centrifugal fan through the ventilation hole.

3. The power tool according to claim 1, wherein the dustproof member comprises a hole portion through which the rotor can pass, and
    wherein the protruding portion extends axially from an end surface of the hole portion.

4. A power tool, comprising:
    a stator comprising a substantially cylindrical yoke and a plurality of permanent magnets that are firmly fixed to an inner surface of the yoke and circumferentially spaced from each other by a first gap;
    a rotor inserted inside the permanent magnets at a second gap radially;
    an outer frame portion that accommodates the stator and the rotor;
    a ventilation hole formed in the outer frame portion to place the first gap and the second gap in communication with an atmosphere; and
    a dustproof member comprising a ferromagnetic material and mounted in contact with the stator,
    wherein the dustproof member is mounted so as to plug up the second gap at an end surface of the stator.

5. The power tool according to claim 1, wherein the rotor includes a centrifugal fan, said power tool further comprising:
    a second protruding portion disposed between the ventilation hole and said centrifugal fan.

6. The power tool according to claim 5, wherein said second protruding portion comprises a flat plate extending perpendicularly to a radial direction of the stator.

7. The power tool according to claim 1, wherein said dustproof member is mounted to said stator by a magnetic force to substantially cover an end surface of the stator.

8. The power tool according to claim 1, wherein a base portion of said dustproof member is mounted to said stator by a magnetic force to substantially cover an end surface of the stator.

9. The power tool according to claim 8, wherein said base portion substantially completely fills said first gap.

10. The power tool according to claim 1, wherein said protruding portion comprises a substantially cylindrical member that extends axially, forwardly from said passage.

11. The power tool according to claim 1, wherein said protruding portion comprises an inside diameter substantially equal to an inside diameter of said permanent magnets.

12. The power tool according to claim 1, wherein said protruding portion projects over an entire periphery of said passage.

13. The power tool according to claim 1, further comprising:
 a second protruding member, which is engaged in a recess of said cylindrical yoke.

14. The power tool according to claim 5, further comprising:
 a third protruding member, which is engaged in a recess of said cylindrical yoke.

15. A dustproof member for a power tool, comprising:
 a base portion, which is mountable on the power tool; and
 at least one protruding portion extending from the base portion,
 wherein said dustproof member comprises a ferromagnetic material, and
 wherein said at least one protruding portion comprises:
 a first protruding portion located in a passage of a stator of the power tool;
 a second protruding portion comprising a flat plate extending perpendicularly, forwardly from said base portion; and
 a third protruding portion comprising a flat plate extending perpendicularly, rearwardly from said base portion, said at least one protruding portion being formed in a recess on the power tool.

* * * * *